(12) United States Patent
Marion

(10) Patent No.: US 7,589,887 B2
(45) Date of Patent: Sep. 15, 2009

(54) LOW LOSS FIBER OPTIC LINK USING AN OPTICAL AMPLIFIER

(75) Inventor: Robert C. Marion, Pelham, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 11/439,212

(22) Filed: May 24, 2006

(65) Prior Publication Data

US 2007/0273962 A1    Nov. 29, 2007

(51) Int. Cl.
*H01S 3/00* (2006.01)
(52) U.S. Cl. .............................. 359/333; 398/115; 342/9
(58) Field of Classification Search .............. 359/341.2, 359/337, 337.1, 333; 398/115; 342/9
See application file for complete search history.

(56) References Cited

U.S. PATENT DOCUMENTS

| 4,808,999 | A   | * | 2/1989  | Toman ........................ 342/15 |
| 5,260,820 | A   | * | 11/1993 | Bull et al. .................... 398/125 |
| 6,256,090 | B1  | * | 7/2001  | Chen et al. .................. 356/73.1 |
| 6,563,969 | B2  | * | 5/2003  | Ames .......................... 385/12 |
| 6,804,495 | B2  | * | 10/2004 | Duthie ..................... 455/67.11 |
| 6,856,768 | B2  | * | 2/2005  | Gnauck et al. ................ 398/83 |
| 2002/0145554 | A1 | * | 10/2002 | Lloyd et al. .................. 342/13 |

* cited by examiner

*Primary Examiner*—Mark Hellner
(74) *Attorney, Agent, or Firm*—Bingham McCutchen LLP; Robert C. Bertin

(57) ABSTRACT

An optical amplifier is included within a fiber optic transmission system for driving a fiber optic towed decoy system. The optical amplifier boosts the optical power of a laser on board the driving system and compensates for link loss within the driving system and link loss associated with a blind connection between the driving system and the towed decoy. The optical amplifier may be an erbium doped fiber amplifier and may be run in a saturation mode. The result is a towed decoy system capable of operating more consistently across a range of platforms and in some cases less stringent gain requirements on towed decoy components.

15 Claims, 2 Drawing Sheets

LOW LOSS FIBER OPTIC LINK USING AN OPTICAL AMPLIFIER

FIELD OF THE INVENTION

The present invention relates generally to the use of optical amplifiers in fiber optic communication links and, in particular, to the use of an optical amplifier in fiber optic links for gain control where the operating environment of the link is variable.

BACKGROUND OF THE INVENTION

The use of optical fibers in communication links has grown because of the high data rates achievable using optical communications. In addition, fiber optic links are less susceptible to electromagnetic interference and thus are used in military and other applications where the possibility of high levels of electromagnetic interference exists.

In general in optical fiber communications, fibers are designed to connect a transmission system and a receiving system with a minimum of optical losses. For long haul communication systems, the optical fiber communications link itself may include amplifiers at periodic distances for amplifying attenuated optical signals for the next leg of the long distance link. For relatively short optical fiber links, attenuation is generally less problematic. For certain short distance optical fiber applications, however, optical attenuation and predictable optical signals levels remain problematic.

Certain military applications, for example, utilize fiber optics to convey optical signals from a location that has good electromagnetic shielding to another location that does not have good electromagnetic shielding. As such, the optical fibers convey signals as light through a harsh environment, thus protecting the signals from electromagnetic interference. Such applications include optical fiber towed decoy applications. In these applications, decoys may be connected both physically and optically to an aircraft and one or more decoys may be towed behind the aircraft and deployed as a countermeasure to help the aircraft evade hostile, incoming guided missiles.

There are several problems associated with optical fiber towed decoys that are driven by the optical link performance. First, the optical loss between the transmitter and the optical receiver of the decoy is variable based on the number of connectors and the loss of each connector. Since the impact on the RF performance is 2:1 with respect to the optical connector and fiber losses, these losses are significant. Second, the optical loss can change as a function of time or the operating environment. In particular, fiber optic blind mate connectors that are exposed to the external environment can suffer degradation due to multiple mating cycles and a harsh environment in terms of cleanliness. With the current optical link design, there is not a way to compensate for the additional loss and system level RF performance may be negatively impacted. The current approach to addressing the optical loss variation is to maintain higher than desirable gain in the decoy. This high gain can be problematic because high gain in a small package can impact stability. Third, the current approach does not address compatibility between different platforms where the optical loss may be different. The current approach is based on a worst case loss allocation and the towed decoy gain requirements are higher than desirable to ensure system performance requirements are met. However, application of this system to other platforms is limited due to the worst case assumptions used.

There is a need, therefore, for a system and method of configuring a fiber optic system on an aircraft and on a towed decoy that are compatible across a wide range of optical attenuation in an optical fiber link. There is a further need for a system and method of implementing a fiber optic system on an aircraft that produces an optical signal for driving a fiber optic towed decoy that is more robust, consistent and economical.

SUMMARY OF THE INVENTION

According to an embodiment of the present invention, an optical amplifier is included within a fiber optic transmission system for driving a fiber optic towed decoy system. The optical amplifier boosts the optical power of a laser on board the driving system and compensates for link loss within the driving system and link loss associated between a blind-connection between the driving system and the towed decoy. The optical amplifier may be an erbium doped fiber amplifier and may be run in a saturation mode. The result is a towed decoy system capable of operating more consistently across a range of platforms and in some cases less stringent gain requirements on towed decoy components.

According to one embodiment of the invention, a towed decoy communications system, includes a laser signaling system and an erbium doped fiber amplifier (EDFA). The laser signaling system is capable of generating an optical signal for a towed decoy. The erbium doped fiber amplifier (EDFA) is coupled to the laser signaling system that amplifies the optical signal for application to at least one towed decoy. The towed decoy communications system may further include an optical switch coupled to the EDFA capable of conveying the amplified optical signal to at least one towed decoy. Additionally, the laser signaling system may include a laser and a Mach Zehnder Modulator. The towed decoy itself may include a photo-diode that receives the amplified optical signal and converts the amplified optical signal to a radio frequency signal that is capable of being amplified and broadcast to disrupt an incoming guided missile. The towed decoy may further include a solid state amplifier that amplifies the radio frequency signal and at least one traveling wave tube coupled to the output of the solid state amplifier that further amplifies the radio frequency signal.

BRIEF DESCRIPTION OF THE FIGURES

The above described features and advantages of the present invention are more fully described with reference to the detailed description and Figures, in which.

DETAILED DESCRIPTION

According to an embodiment of the present invention, an optical amplifier is included within a fiber optic transmission system for driving a fiber optic towed decoy system. The optical amplifier boosts the optical power of a laser on board the driving system and helps compensate for optical link loss associated with the driving system and optical link loss associated with a blind connection and other sources of attenuation between the driving system and the towed decoy.

Figure 1:
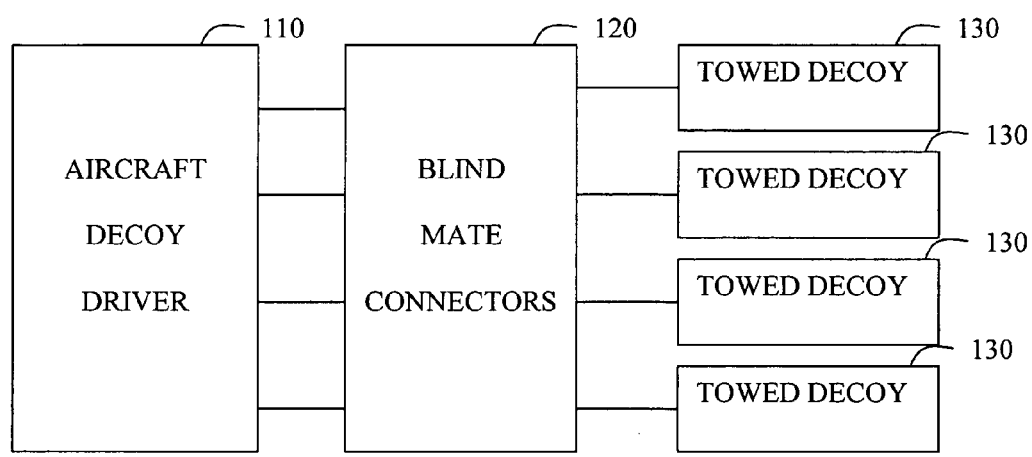
FIG. 1 depicts a towed decoy communications system.

FIG. 1 depicts the basic elements of a towed decoy system 100. Referring to FIG. 1, the system includes an aircraft decoy driver system 110 within an aircraft body, blind mate connectors 120 and one or more towed decoy systems 130. In general, the system is designed to deploy one active decoy system at a time. The blind mate connector is coupled using fiber optic lines between the aircraft decoy driver 110 and each towed decoy 130.

The aircraft decoy driver system 110 converts a radio frequency RF signal input into an optical signal that is conveyed to a towed decoy system for the purpose of producing decoy signals designed to confuse an incoming guided missile. The blind mate connector is an optical connector that is used to connect fiber optic cables for each towed decoy to the aircraft decoy driver system. The blind mate connector is in frequent use for connecting and disconnecting towed decoys to aircraft. Thus, the points of connection within the connector become dirty and less effective over time and use, with the result being increased attenuation of optical signals passing through the connector. Other connectors on the aircraft between the blind mate connector and the aircraft decoy driver system also contribute attenuation to optical signals transmitted between the decoy driver system and the towed decoy system. Each of these connectors may introduce attenuation on the order of 0.2 dB to 0.75 dB. The impact of each source of optical attenuation has twice the impact attenuation on the RF signal due to the modulation transfer function.

A single aircraft may have multiple blind mate connectors for connecting multiple towed decoys. During operation, only one towed decoy is generally active at a time. The towed decoy receives the optical signal from a fiber optic line coupled to the blind mate connector and converts the signal to RF energy and in turn broadcasts the RF signal to confuse incoming guided missiles. A characteristic of such towed decoy systems is that they have high gain. Because of this, the level of the optical signal entering the towed decoy is part of the overall amplification within the system. Accordingly, when the attenuation of the optical signal, through connectors on the aircraft and the blind mate connector is high, the towed decoy many not operate properly. Moreover, because towed decoys are designed to be deployed on several different aircraft, the level of the optical signal is somewhat unpredictable and varies from aircraft to aircraft. This can lead to unpredictable performance results and unwanted oscillation within the towed decoy RF system.

Figure 2:
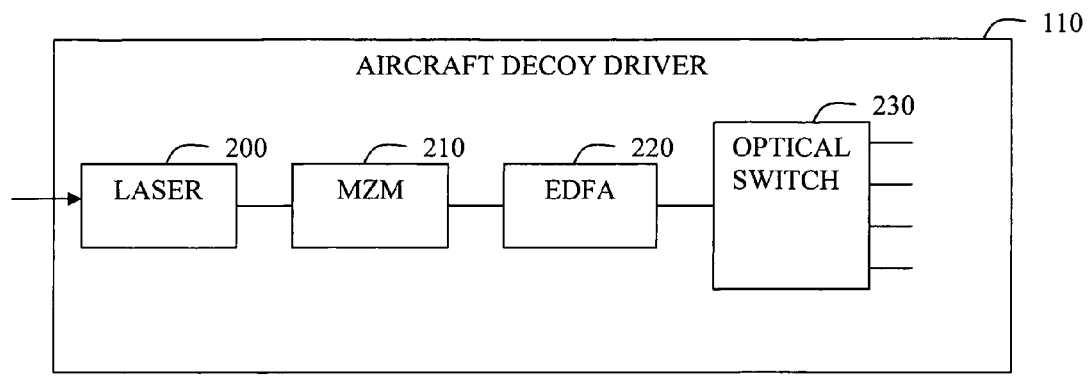
FIG. 2 depicts a decoy driver system according to an embodiment of the present invention.

Referring to FIG. 2, the aircraft decoy driver system 110 includes a laser 200, a Mach Zehnder Modulator (MZM) 210, an erbium doped fiber amplifier (EDFA) 220 and an optical switch 230. The laser 200 may be any convenient laser. According to one embodiment of the invention, the laser produces light at a wavelength of 1550 nm. The MZM receives the laser input and a RF signal input and pursuant to the well known MZM modulation process modulates the light with the RF signal. The MZM may be any convenient MZM, including those commercially supplied by JDS Uniphase.

The EDFA 220 increases the signal level of the optical signal. It produces a relatively constant output power and operates in a saturated mode. The EDFA 220 boost the optical signal level and thus is able to compensate when a relatively weak laser source is used. This enables one to decrease the implementation cost of the optical transmission system. In addition, the EDFA 220 tends to produce a relatively constant output power and therefore produces a more predictable optical signal level at the blind mate connector.

The optical switch 230 introduces additional attenuation in the optical path. However, it is used to allow the connection of multiple towed decoys to the aircraft decoy driver. According to one embodiment of the invention, up to four towed decoys may be connected to the optical switch. At any given time, one towed decoy is active and the optical path from the laser is coupled to the optical path leading to the active towed decoy.

Figure 3:
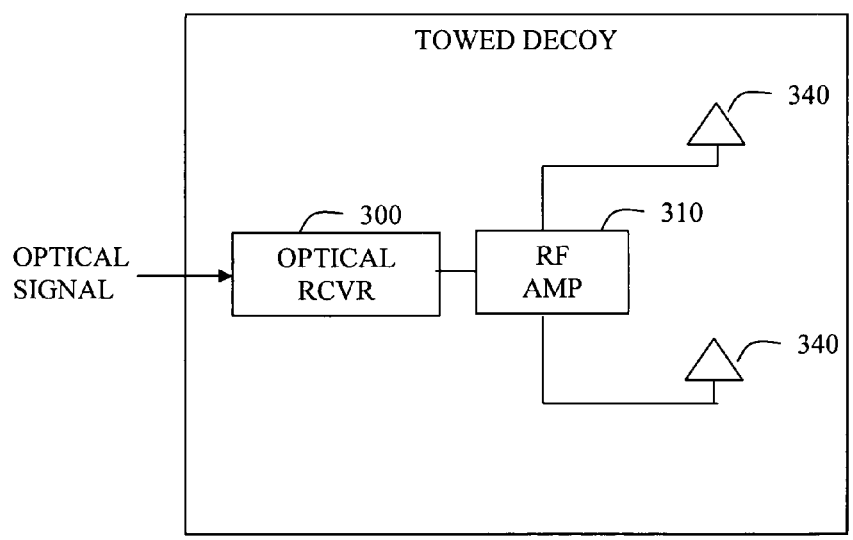
FIG. 3 depicts a towed decoy for interfacing with a decoy driver system according to an embodiment of the present invention.

FIG. 3 depicts a fiber optic towed decoy system suitable for use with a EDFA 220 in the aircraft decoy driver system. Referring to FIG. 3, the towed decoy includes an optical receiver 300, monitor circuitry 305, a RF amplifier 320 and two antennas 340. This embodiment is illustrative, and any number of antennas may be implemented according to the present invention.

The optical receiver 300 receives the optical signal from a fiber optic line coupled to the blind mate connector. A photodiode, for example, within the optical receiver converts the optical signal into a radio frequency (RF) signal. The RF signal then travels to the RF amplifier 320 and is amplified prior to being applied to the antennas 340, which transmit the amplified signals. The signals transmitted from the antennas 340 are powerful and may be used, for example, to disrupt the operation of incoming guided missiles. Because the optical amplifier transmits the signal at a relatively high and consistent level, the optical signal arriving at the optical receiver has a level that is less dependent on optical attenuation in connectors in the optical path. The result is better performance and a more predictable signal being generated by the towed decoy. In addition, the EDFA device may allow the gain required in the towed decoy to be less and therefore permit the use of less expensive components in the towed decoy.

While particular embodiments of the present invention have been described, it will be understood by those having ordinary skill in the art that changes may be made to those embodiments without departing from the spirit and scope of the present invention.

What is claimed is:

1. A towed decoy communications system, comprising:
   a laser signaling system operable to generate an optical signal for a towed decoy;
   an erbium doped fiber amplifier (EDFA) coupled to the laser signaling system that amplifies the optical signal for application to at least one towed decoy; and
   an optical switch coupled to the EDFA operable to convey the amplified optical signal to the at least one towed decoy;
   wherein the EDFA operates in saturation mode and produces a constant output power to compensate for attenuation of fiber optic connections to the towed decoy.

2. The towed decoy communications system according to claim 1,
   wherein the laser signaling system comprises a laser and a Mach Zehnder Modulator.

3. The towed decoy communications system according to claim 1,
   wherein the laser signaling system comprises a laser and directly modulates an input signal.

4. The towed decoy communications system according to claim 1, wherein the towed decoy includes an optical receiver that receives the amplified optical signal and converts the amplified optical signal to a radio frequency signal that is operable to be amplified and broadcast to disrupt an incoming guided missile.

5. A towed decoy communications system, comprising:
   a laser signaling system operable to generate an optical signal for a towed decoy;
   an erbium doped fiber amplifier (EDFA) coupled to the laser signaling system that amplifies the optical signal; and an optical switch coupled to the EDFA operable to convey the amplified optical signal to at least one towed decoy;

wherein the EDFA operates in saturation mode and produces a constant output power to compensate for attenuation of fiber optic connections to the towed decoy.

6. The towed decoy communications system according to claim 5, wherein the laser signaling system comprises a laser and a Mach Zehnder Modulator.

7. The towed decoy communications system according to claim 5, wherein the laser signaling system comprises a laser and directly modulates an input signal.

8. The towed decoy communications system according to claim 5, wherein the laser signaling system generates the optical signal from a RF signal.

9. The towed decoy communications system according to claim 5, wherein the laser signaling system generates the optical signal from an optical signal.

10. The towed decoy communications system according to claim 1, wherein the towed decoy includes an optical receiver that receives the amplified optical signal and converts the amplified optical signal to a radio frequency signal that is operable to be amplified and broadcast to disrupt an incoming guided missile.

11. The towed decoy communications system according to claim 5, wherein the laser signaling system further comprises a laser and a Mach Zehnder Modulator and wherein the amplifier is operated in saturation.

12. An aircraft decoy driver, comprising:

a laser signaling system operable to generate an optical signal for a towed decoy;

an erbium doped fiber amplifier (EDFA) coupled to the laser signaling system that amplifies the optical signal for application to at least one towed decoy; and an optical switch coupled to the EDFA operable to convey the amplified optical signal to the at least one towed decoy;

wherein the EDFA operates in saturation mode and produces a constant output power to compensate for attenuation of fiber optic connections to the towed decoy.

13. The aircraft decoy driver according to claim 12, wherein the laser signaling system comprises a laser and a Mach Zehnder Modulator.

14. The aircraft decoy driver according to claim 12, wherein the laser signaling system comprises a laser and directly modulates an input signal.

15. The aircraft decoy driver according to claim 12, wherein the towed decoy includes an optical receiver that receives the amplified optical signal and converts the amplified optical signal to a radio frequency signal that is operable to be amplified and broadcast to disrupt an incoming guided missile.

\* \* \* \* \*